3,421,349
RETRACTABLE KEY HOLDER
Harold R. St. Clair, Jr., Rte. 8, Lexington, Ohio 44904
Filed Jan. 23, 1967, Ser. No. 611,096
U.S. Cl. 70—414                                        1 Claim
Int. Cl. E05b 19/00

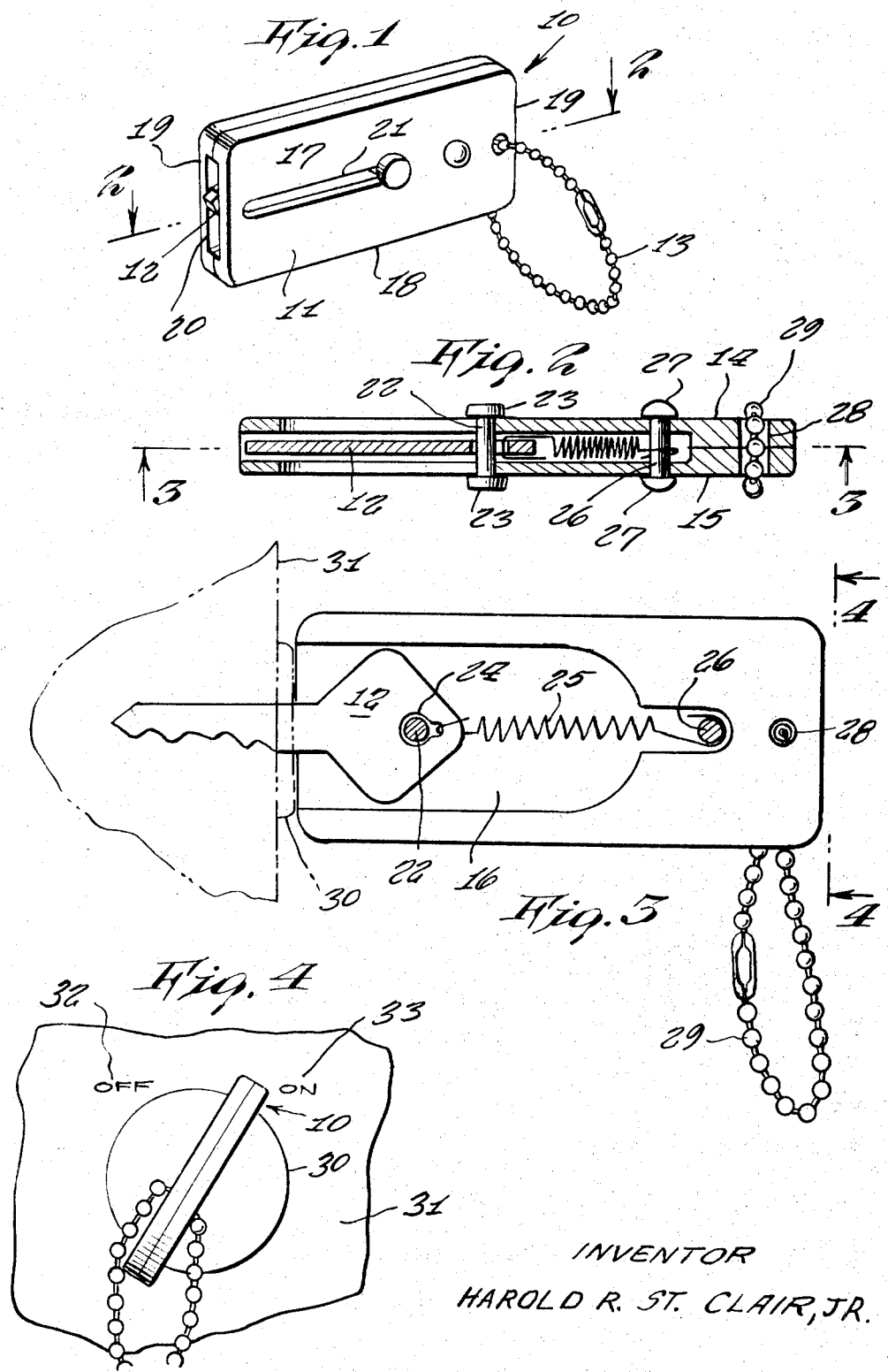

ABSTRACT OF THE DISCLOSURE

A key case for supporting a key therewithin, but which is retractable outward from the case by simply pushing against a button extending out of the case and which causes the key to be moved outwardly through a slot against the action of the return spring, this construction being particularly adaptable for use as a holder for an automobile ignition key whereby the key will instantly disengage with the ignition switch and retract into the case when the case is turned to an off position.

---

This invention relates generally to key holders. More specifically it relates to holders for automobile ignition keys.

A principal object of the present invention is to provide a retractable key holder for containing an automobile ignition key and which has self-contained means for disengaging the key with the ignition switch when the key is turned to an off position.

Another object of the present invention is to provide a retractable key holder wherein the key is normally urged outward of a case comprising the holder by moving outward through a slot in the end of the case when a push button extending out of the case is manually pushed.

Another object of the present invention is to provide a retractable key holder wherein the key is normally urged into return position by a return spring contained within the case.

Yet another object of this invention is to provide a retractable key holder wherein the case does not have to be opened up in order to move the key between an exposed operative position and a retracted non-operative position.

Other objects of the present invention are to provide a retractable key holder which is simple in design, inexpensive to manufacture, rugged in construction, easy to use and efficient in operation.

These and other objects will be readily evident upon a study of the following specification and the accompanying drawing, wherein:

FIGURE 1 is a perspective view of the present invention with the key shown in a retracted position;

FIGURE 2 is a cross-sectional view taken on the line 2—2 of FIGURE 1;

FIGURE 3 is a cross-sectional view taken on the line 3—3 of FIGURE 2; and

FIGURE 4 is an end view of the present invention as viewed along line 4—4 of FIGURE 3 and shown in operative use.

Referring now to the drawing in detail, the reference numeral 10 represents a retractable key holder, according to the present invention, wherein there is a case 11 for containing a key 12 and which is provided with a key chain 13 so that the same may be used to support a variety of other keys thereupon.

The case 11 is comprised of a rectangular configurated member which may be formed either from a single part or a pair of plates 14 and 15 placed in side by side abutment and between which a recess 16 is formed into which the key 12 is receivable. The case includes parallel, flat opposite sides 17 bounded by parallel opposite side edges 18 and opposite end edges 19. One of the end edges 19 is provided with a mouth 20 for the recess 16 and through which the key 12 is moveable inward and outward of the case. A longitudinally extending slot 21 is provided through each of the plates 14 and 15, in each of the side walls 17. A push pin 22 extends transversely through the case and the slots 21, the push pin 22 being provided with enlarged heads 23 at each opposite end so as to retain the push pin to the case and so as to provide a means whereby the push pin may be manually urged to move along the slot by a person's finger. The push pin extends also through an opening 24 provided in the key 12. Thus as the push pin is urged to move along the slot, the key 12 is urged outwardly of the case.

As shown in FIGURES 2 and 3 of the drawing, the opening 24 of the key 12 is also provided to engage one end of a tension coil spring 25, the opposite end of the coil spring being secured around a stationary, transverse extending pin 26 which may be used to secure the two plates 14 and 15 together, if so preferred. The stationary pin 26 has an enlarged head 27 at each opposite end so as as to retain the assembly together.

A transverse extending opening 28 is provided through the case 11 for purpose of receiving a ball chain 29 therethrough so that a variety of different keys may be also supported from the present device.

In operative use, the present device is placed adjacent ignition switch of an automobile and a person moves the push pin 22 by pressing against one of the enlarged heads 23 thereof with his fingers, thereby causing the ignition key 12 to slide outwardly of the recess 16 of the case 11 and into the ignition switch 30 upon the dashboard 31 of an automobile, and then turning the key from an off position 32 to an on-position 33 as is shown in FIGURE 4 of the drawing. When the key is in the on-position, it cannot be withdrawn from the ignition switch, this being a common practice of construction by automobile manufacturers so as to prevent removal thereof when the engine is running. When the key is in the on position, it will thus cause the case 11 to bear against the front side of the switch 30, as shown in FIGURE 3 of the drawing. When the key is turned to an off-position, it becomes readily retractable outward from the switch, thus causing the key to be retracted by means of spring 25 back into the case 11 automatically. When this occurs, the case with its ignition key 12 is within a person's hand due to the hand having turned the key to the off position. Thus there is no danger of a person forgetting the key within the ignition switch after the automobile engine has been shut off. Thus the present invention eliminates the possibility of locking the key accidentally within the car or leaving the ignition key within the switch where it would be readily visible to car thieves.

While various changes may be made in the detailed construction, it is understood that such changes will be within the spirit and scope of the present invention as is defined by the appended claim.

I claim:

1. In a retractable key holder, the combination of a case, means within said case for retaining an automobile ignition key, and means whereby said key is movable outwardly of said case and automatically retractable within said case when said key is turned from an on to an off position in an automobile ignition switch, said key being spring loaded for returning within said case, said case including a flat recess therewithin for receiving said key, said recess communicating at one end with an end wall of said case so to allow outward movement of said key, opposite side walls adjacent said recess, a slot in each said side wall, a transverse pin extending across said recess and into said slots, said pin being slidable along said slots, said pin engaging an opening in said key, the opposite end of said recess communicating with a narrow recess, a shoulder thus formed on opposite sides between said recess and said narrow recess, each said shoulder having an outward corner, a second transverse pin extending through said narrow recess and said side walls, one end of a tension coil spring secured to said second transverse pin, said spring extending from said narrow recess into the first said recess where it is secured at its opposite end to said opening of said key, and said shoulders being spaced equally apart from a central longitudinal axis of said spring whereby a head of said key will abut said outward corners at the same time so to keep said key along said axis when inside said case.

References Cited

UNITED STATES PATENTS

| | | | |
|---|---|---|---|
| 2,484,547 | 10/1949 | Bishop | 70—414 |
| 2,547,524 | 4/1951 | Gross | 70—414 X |
| 2,659,231 | 11/1953 | Glubiak | 70—414 |
| 2,931,208 | 4/1960 | Prim | 70—414 |

FOREIGN PATENTS 716,277    9/1954    Great Britain.

MARVIN A. CHAMPION, *Primary Examiner.*

PERRY TEITELBAUM, *Assistant Examiner.*

U.S. Cl. X.R.

70—456